3,080,335
Patented Mar. 5, 1963

3,080,335
USE OF AMMONIA-YIELDING COMPOUNDS IN THE PIGMENTING OF THERMOPLASTIC RESINS AND METHODS THEREFOR
Stanley Klosowski, East Orange, N.J., assignor to Celanese Corporation of America, New York, N.Y., a corporation of Delaware
No Drawing. Filed Feb. 29, 1960, Ser. No. 11,410
19 Claims. (Cl. 260—41)

The present invention relates to a novel process for pigmenting thermoplastic resins. More particularly, it is concerned with a process for uniformly distributing a pigment in polyethylene resins. Still more particularly, it relates to the uniform distribution of a pigment in a high density polyethylene resin with the aid of an ammonia-yielding compound.

Pigments are conveniently dispersed in a thermoplastic resin by admixture of the pigment, generally in a dry state, with the resin in a particulate state, followed by heating the admixture to a thermoplastic state while mechanically working the admixture to obtain uniform blending. It is often advantageous to achieve pigmentation while heating and working the resin for another purpose, as for example, during the formation of molding pellets or during the formation of shaped consumer articles. It has been found that the uniformity of pigment dispersion in such cases, for a given amount of working, is often not as good as required for commercial acceptability.

It is a principal object of the present invention to provide a process for obtaining uniformly pigmented thermoplastic resin and particularly high density polyethylene resin of high grade. It is a further object to provide a shaped polyethylene resin product intimately and uniformly admixed with a pigment.

These and other objects are attained in a convenient and straightforward manner. It has been unexpectedly found that uniform dispersion of pigment in a thermoplastic resin can be accomplished by utilizing a small amount of an ammonia-yielding compound in either liquid or solid form in the pigmentation of the resins in the thermoplastic state.

According to the present invention, the overall process contemplates the intimate admixing of a major amount of a thermoplastic resin, a minor amount of an ammonia-yielding compound and a minor amount of a pigment at an elevated temperature sufficient to maintain the resin in thermoplastic state and to release ammonia in situ, and if desired, the pigmented resin may be further treated to shape the same to obtain, for instance, an extruded or injection molded product.

Prior to treatment, the resin which may be treated according to the process of the invention can exist in various physical forms. For instance, high density polyethylene resin in the form of flakes or pellets may be treated. It is a convenient practice to employ flakes of resin, since this permits pigmentation to be accomplished during a pelletizing operation.

A large variety of pigments can be employed for purposes of this invention. Some such pigments are carbon black, titanium dioxide, ultramarine blue, copper phthalocyanine blue, burnt sienna iron oxide, raw umber iron oxide, alizarin maroon, copper phthalocyanine green, cadmium primrose yellow, cadmium lemon yellow and cadmium red. However, mixtures of the latter-mentioned pigments may, if desired, be similarly incorporated to treat the polyethylene resin.

It is an advantage of the present invention that small amounts of pigment can be incorporated into the resin to obtain uniform dispersion therein. Usually not more than about five percent and preferably between one and three percent, based on the weight of the resin is a good practice, though higher or lower percentages may be used without detrimental effect. With carbon black and high density polyethylene, acceptable results are obtained where a range of between one and three percent is employed.

Uniform dispersion of the pigment in the polyethylene resin is advantageously accomplished by the use of minor amounts of an ammonia-yielding compound capable of yielding ammonia at the temperature at which the resin is in the plastic state. In most cases it is preferred that the decomposition products other than ammonia be volatile or at least non-deleterious in the resin composition.

Some of the more typically illustrative ammonia-yielding compounds are: ammonium hydroxide; ammonium salts of carbonic acid including ammonium bicarbonate and ammonium carbonate; and ammonium salts of carboxylic acids including ammonium oxalate, ammonium succinate, ammonium tartrate and ammonium citrate.

The particular ammonia-yielding compound best suited for a particular application will depend upon the temperature range for the softening and working of the particular resin. Compounds requiring relatively high temperatures for ammonia release are best suited for resins requiring relatively high temperatures for softening and thermoplastic working. For high density polyethylene a suitable temperature range is between about 130° and 250° C. and preferably between about 150° and 200° C.

The amount of ammonia yielding compound used in the admixture may suitably vary from about 0.02 to 3 percent, based on the weight of the resin. Lesser proportions will assist in achieving uniformity but will not be fully effective. Greater proportions are uneconomical. A preferred range of proportions is from about 0.05 to 2.5 percent.

Any suitable apparatus may be used in admixing the pigment and ammonia-yielding compound with the particulate resin to obtain a uniform blend. Tumbling end over end in a drum blender is generally a suitable method of blending. A ribbon blender may be used to handle larger quantities of material. The blending process is suitably continued until gross uniformity of the admixture is obtained, that is until a sample of about 1% taken from one portion of the admixture would have the same composition as a sample of about 1% taken from another portion.

The heating of the admixture to plastic state and the working thereof may also take place on any suitable apparatus. For example, it may take place on the rolls of a rubber mill. Most conveniently however, the heating and working take place in an apparatus wherein the plastic admixture is forced through a small orifice as in an extrusion operation or an injection molding operation. The operation of the screw in the barrel of an extruder followed by the turbulence created in forcing the plastic mixture through the extruder orifice usually provides sufficient working for obtaining uniform admixture in accordance with this invention.

In the extrusion of high density polyethylene, barrel temperatures are between about 150° and 200° C.

Uniformity of pigment dispersion is determined by the Universal Rating System (URS) of the overall treated resin. This test can be characterized as follows:

Each specimen consists of 24 round films, approximately 0.070" in diameter, sandwiched between two microscope slides. Each film is made by pressing a single pellet of the sample and punching a circle from the resultant film.

Eighteen of the 24 circles are examined by two different observers and rated by comparison (at 100x magnification) with a set of standard photomicrographs. The standard photomicrographs are numbered to No. 15 with the higher number representing photomicrographs showing large numbers of large agglomerated particles. The individual circles are rated to the nearest whole number by each observer and the 18 values for each observer are averaged and reported to the nearest tenth of a dispersion unit. Then the averaged values for both observers are averaged and reported to the nearest tenth of a dispersion unit on the URS rating. The lower the URS reading, the more uniform the dispersion of pigment in the product will be. Advantageously, substantial improvement is obtained herein when utilizing the aforementioned principles.

The following examples are illustrative of the best practice of the invention and should not be taken as limitive thereof. Unless otherwise stated, the parts are by weight.

Example I 97 parts of polyethylene resin in flake form having a density of 0.96 g./cm.$^3$ and a melt index of 0.7 are intimately admixed with 0.5 part of aqueous ammonium hydroxide (28%) in a stainless steel vessel which is tumbled end-over-end at about 30 r.p.m. for about 30 minutes. Two and one-half (2.5) parts of channel black (Monarch 74) are next added and tumbled for an additional 30 minutes. The resin so treated is placed in a two inch, vented, twin-barreled extruder with a 34-inch long main screw and a 17¾ inch long secondary screw. The extruder had a screen pack having screens of 20, 50, 80, 100 and 20 mesh respectively in the direction of resin flow. The screw speed, temperature at the orifice, output and Universal Rating of the pigment dispersion are shown in Table I, below.

Examples II to VIII

Example I was repeated, using ammonia-yielding materials of the nature and amount shown in Table I and using screw speeds and orifice temperatures also shown in Table I. The results were as follows:

densities between about 0.94 and about 0.96 g./cm.$^3$, but also including conventional polyethylene resins. The invention is also applicable to other polyolefin resins, such as polypropylene and to copolymers of ethylene and propylene with other olefinic monomers.

It is to be understood that the foregoing detailed description is given merely by way of illustration and that many variations may be made therein without departing from the spirit of my invention.

Having described my invention what I desire to secure by Letters Patent is:

1. In a process for intimately admixing and uniformly dispersing pigment in a thermoplastic polyolefin resin in which an admixture of pigment and resin particles is heated to thermoplastic state and worked in said thermoplastic state, the improvement which comprises incorporating into said resin and pigment a minor amount of an ammonia-yielding compound which decomposes to release ammonia in situ at the temperature of said resin in thermoplastic state.

2. A process according to claim 1 wherein the pigment is carbon black.

3. A process according to claim 1 wherein the so-pigmented resin is shaped simultaneously with the working thereof.

4. A process according to claim 1 wherein the ammonia-yielding compound is present in an amount of from about 0.05 to about 2.5 percent, based on the weight of said resin.

5. A process according to claim 1 wherein the ammonia-yielding compound is ammonium hydroxide.

6. A process according to claim 1 wherein the ammonia-yielding compound is ammonium bicarbonate.

7. A process according to claim 1 wherein the ammonia-yielding compound is ammonium carbonate.

8. A process according to claim 1 wherein the ammonia-yielding compound is ammonium oxalate.

9. A process according to claim 1 wherein the ammonia-yielding compound is ammonium succinate.

10. A process according to claim 1 wherein the resin is in flake form prior to treatment.

11. A process according to claim 1 wherein said resin is a high density polyethylene resin.

12. An improved process for uniformly dispersing pigment in a high density polyethylene resin which comprises: incorporating into said resin a pigment and a minor amount of an ammonia-yielding compound, heating the mixture at an elevated temperature sufficient to convert the mixture to a thermoplastic state and to release ammonia in situ, forcing said thermoplastic mixture to pass through a constricted orifice whereby said resin is shaped while uniform dispersion of pigment is obtained.

13. A process according to claim 12 wherein the pigment is carbon black.

| Example | NH$_3$-Yielding Comp'd | Parts by Weight | Screw Speed | Orifice Temp., degrees | Output [b] | URS |
|---|---|---|---|---|---|---|
| I | NH$_4$OH(28%) [a] | 0.5 | 166 | 201 | 63 | 6.6 |
| II | NH$_4$OH(28%) [a] | 0.05 | 166 | 205 | 56 | 6.9 |
| III | None | | 168 | 198 | 54 | 8.4 |
| IV | NH$_4$OH(24%) [a] | 0.05 | 165 | 198 | 55 | 7.2 |
| V | NH$_4$HCO$_3$ | 2.3 | 170 | 200 | 49 | 6.0 |
| VI | (NH$_4$)$_2$(COO)$_2$·H$_2$O | 2.4 | 170 | 199 | 55 | 6.9 |
| VII | NH$_4$OH(28%) [a] | 1.8 | 170 | 200 | 61 | 6.2 |
| VIII | None | | 170 | 198 | 52 | 8.1 |

[a]-Aqueous.
[b]-Lbs. per hr.

While the invention has been described with specific reference to a particular polyethylene resin, it is to be understood that it is applicable to other polyethylene resins, especially high density polyethylene resins having 14. A process according to claim 13 wherein the ammonia-yielding compound is present in an amount of from about 0.05 to about 2.5 percent, based on the weight of said resin.

15. A process according to claim 12 wherein the constricted orifice is an extrusion orifice.

16. A process according to claim 15 wherein said extrusion is carried out at a barrel temperature between 150° and 200° C.

17. A composition comprising an admixture of a thermoplastic polyolefin resin in particulate form, a pigment and an ammonia-yielding compound.

18. The composition of claim 17 wherein said resin is high density polyethylene and said pigment is carbon black.

19. The composition of claim 17 wherein said ammonia-yielding compound is present in an amount of about 0.05 to 2.5 percent, based on the weight of the resin.

References Cited in the file of this patent

UNITED STATES PATENTS

| | | |
|---|---|---|
| 1,560,465 | Carson | Nov. 3, 1925 |
| 2,540,146 | Stober | Feb. 6, 1951 |
| 2,635,057 | Jordan | Apr. 14, 1953 |

FOREIGN PATENTS

| | | |
|---|---|---|
| 604,695 | Great Britain | July 8, 1948 |
| 771,955 | Great Britain | Apr. 10, 1957 |
| 499,163 | Canada | Jan. 12, 1954 |